Nov. 13, 1951 T. P. SIMPSON 2,574,503
METHOD AND APPARATUS FOR HYDROCARBON CONVERSION
Filed Feb. 12, 1946 2 SHEETS—SHEET 1

Fig.1,

INVENTOR
THOMAS P. SIMPSON
BY John A. Crowley
AGENT OR ATTORNEY

Nov. 13, 1951 T. P. SIMPSON 2,574,503
METHOD AND APPARATUS FOR HYDROCARBON CONVERSION
Filed Feb. 12, 1946 2 SHEETS—SHEET 2

INVENTOR
THOMAS P. SIMPSON
BY
John A. Crowley, Jr.
AGENT OR ATTORNEY

Patented Nov. 13, 1951

2,574,503

UNITED STATES PATENT OFFICE 2,574,503

METHOD AND APPARATUS FOR HYDRO-CARBON CONVERSION

Thomas P. Simpson, Woodbury, N. J., assignor to Socony-Vacuum Oil Company, Incorporated, a corporation of New York Application February 12, 1946, Serial No. 647,173

31 Claims. (Cl. 196—52)

This application is a continuation-in-part of application Serial No. 518,820, filed in the United States Patent Office January 19, 1944, now Patent No. 2,423,411.

This invention is related to a method and apparatus for hydrocarbon conversion in the presence of a moving mass of particle form contact mass material. It has particularly to do with a method and apparatus for introduction of catalyst and liquid hydrocarbon charge into the conversion zone.

Exemplary of processes of this type is a recently developed process for continuous cracking conversion of hydrocarbons wherein a particle form solid catalytic material passes cyclically through zones or vessels in the first of which it is contacted with liquid hydrocarbons for the purpose of converting said liquid hydrocarbons to lower boiling hydrocarbon products and in the second of which carbonaceous contaminants deposited on the catalyst during the hydrocarbon conversion are burned off by means of a fluid regeneration medium such as a combustion supporting gas. The catalyst in this process moves within the conversion zone and the regeneration zone as a substantially compact column of downwardly moving particles and it may be continuously passed from the lower end of the regenerator vessel to a suitable mechanical elevator operating at substantially atmospheric pressure and conveyed to a surge or supply hopper located elevationally above the reactor vessel and then gravitated to the reactor vessel against a pressure therein and likewise contact material may be passed from the bottom of the reactor vessel to a conveyor which delivers it to a surge or supply hopper above the regenerator vessel.

The catalytic contact material in such a process may take the form of natural or treated clays, bauxites, alumina, or synthetic associations of silica, alumina, or silica and alumina to which may be added small percentages of other materials such as certain metallic oxides. The catalyst particles may vary within the size range of about 4 to 100 mesh and may be preferably within the range 4 to 8 mesh by Tyler Standard Screen Analysis.

Two major problems in such processes are the continuous introduction of contact material particles into the conversion zone without escape of reactant gases or substantial breakage of the solid particles or interruption in solid flow; and the uniform distribution of liquid hydrocarbon charge over the entire contact material column cross-section within the conversion zone. It has been found that when liquid hydrocarbons are simply sprayed onto the surface of a contact material column within a conversion zone, very uneven distribution of the hydrocarbon charge over the column cross-section is accomplished with resultant over-conversion of a portion of the hydrocarbons, underconversion of the remaining portion and very uneven carbonaceous contaminant distribution on the contact material.

As for the problem of contact material introduction into the conversion zone, the problem is generally one of introducing particles of contact material from a conveyor or surge hopper operated at atmospheric pressure into a conversion vessel operated at pressures substantially above atmospheric. The use of such forced feed devices as screw conveyors has been found objectionable because of high attrition losses occasioned thereby. It has been found preferable to accomplish contact material introduction to conversion zones by provision of a seal zone above the conversion zone in which is maintained an inert seal gas at a pressure about that in the conversion zone and by introduction of contact material into the seal zone through one or more elongated, vertical feed legs having a cross-sectional area substantially less than that of the seal and conversion zones and by passage of contact material from the seal zone to the conversion zone through a plurality of substantially vertical feed pipes. If the flow of catalyst from the lower or outlet end of such feed legs or pipes is not throttled, and contact material is permitted to freely flow into the upper or inlet end of said pipes, a condition of so-called "free flow" of contact material particles is obtained in the pipes. Thus, due to the normal acceleration of gravity the particles at the lower end of the pipes are falling downwardly at a higher velocity than those at the inlet end thereof so that, except for a very short length adjacent the upper or inlet end of said pipes, the contact material does not entirely fill the pipes nor form a substantially compact column therein. It is with this meaning that the term "free flow" is used in the description and claiming of this invention.

If the flow from the lower end of the feed pipe is throttled so that the total volumetric rate of solid flow from the lower end of the pipe is slightly less than that corresponding to free flow for example about 5–10% less, then free flow in the feed pipe will be prevented.

It will be apparent that under conditions of free flow in feed or discharge pipes to or from vessels operating under gaseous pressure, excessive quantities of gases from the vessels involved may escape therethrough. That this is highly objectionable in most processes may be readily seen by considering the result of such an escape of hydrocarbon vapors from a cracking reaction vessel, operating under, for example, 10 pounds per square inch gauge pressure and 800° F. temperature or higher, through its contact material outlet or inlet pipe, which pipe connects into an external conveyor or supply hopper which in turn may be vented to the atmospheric air. Obviously then, it is usually necessary in such processes to throttle the flow of contact material from the lower or outlet ends of feed or drain pipes to or from vessels operating under gaseous pressures in order to maintain in said pipes a substantially compact column of particle form contact mass material.

When the ordinary type of throttle is used, however, several difficulties may arise. If the flow of contact material is throttled at the outlet end of a drain pipe from a seal zone (i. e. internal conversion zone feed pipe) operating at an inert gaseous pressure substantially above that in a conversion zone located therebelow, a limited quantity of gas will be forced downwardly through the contact material in said feed pipe and into the conversion zone due to the pressure differential. With proper design of said internal feed pipe or pipes, the total amount of inert gas thus passing from the seal zone to the conversion zone may not be excessive or objectionable. However, since the commonly used throttling devices result in a restriction in the free cross-section for flow substantially below that of the internal feed drain pipe, the gas linear velocity at the point of throttling may become very high. This high velocity gas may be sufficient to throw the contact material particles violently against the throttling construction and the walls of the feed pipe, resulting in highly undesirable attrition and reduction in particle size of the contact material. Moreover, with every change in pressure differential between the seal zone and conversion zone, the volumetric rate of flow of contact material through the throttling device and between the seal and conversion zones will change making it very difficult to maintain uniform operating conditions in the conversion vessel and endangering the interruption of solid flow in the gravity feed leg supplying the seal zone.

On the other hand, if contact material is introduced by gravity flow through a feed pipe extending upwardly from a conversion vessel operating under a gaseous pressure substantially above that at the upper end of said feed pipe and the contact material flow is throttled near the lower end of said feed pipe by restricting the cross-sectional area for solid flow, the same difficulties as above described again arise. Moreover, in such a case, the linear rate of gas flow at the location of throttling may become so high as to cause bridging of the contact material at this location resulting in partial or complete stoppage of contact material flow through the feed pipe.

A major object of this invention is the provision of a method and apparatus for introduction of particle form solid contact material and of liquid hydrocarbon charge into a conversion zone, which method and apparatus avoid the difficulties hereinabove described.

A specific object is the provision in a continuous cyclic catalytic process for conversion of high boiling liquid hydrocarbon charges to lower boiling gaseous hydrocarbon products of a method and apparatus permitting the uniform distribution of the liquid hydrocarbon charge over the surface of the contact material within the conversion zone.

These and other objects of this invention will become apparent in the following discussion of the invention and of the drawings attached hereto. Of these drawings.

Before proceeding with the description of the drawings several terms used herein in describing and in claiming this invention will be defined. The term "gaseous," as used herein is intended to broadly cover materials in the gaseous phase under existing operating conditions regardless of the phase of such materials under ordinary atmospheric conditions. The term "high boiling," as applied herein to hydrocarbons and petroleum fractions, is intended to mean a conversion zone charge wherein at least a major proportion of the material boils above the desirable average conversion temperature therefor. The terms "rain" and "raining," as applied to solid particle flow are intended as meaning that the solid particles are falling by gravity as dispersed particles like rain and not as a substantially compact mass.

Figure 1:
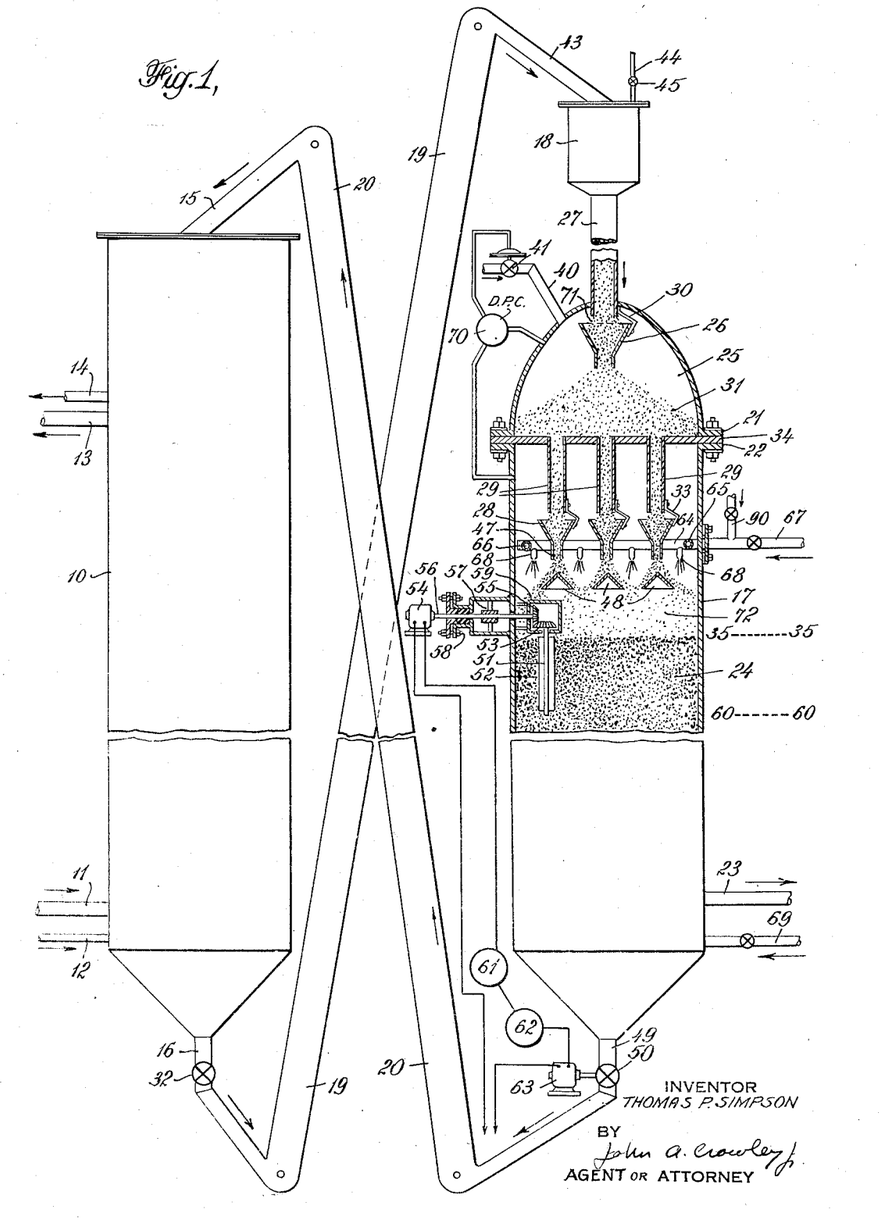
Figure 1 is an elevational view, partially in section, showing a typical installation of a preferred form of the apparatus of this invention in an apparatus for continuous cyclic catalytic conversion of hydrocarbons.

Turning now to Figure 1, we find a diagrammatic flow sketch of a continuous hydrocarbon conversion process. In Figure 1, there is shown a regeneration vessel 10, provided with combustion supporting gas inlet 11 and heat exchange fluid inlet 12 near its lower end and flue gas outlet 13 and heat exchange fluid outlet 14 near its upper end. The heat exchange fluid inlet and outlet connect into heat transfer tubes (not shown) distributed within the regenerator. Also provided is a solid material inlet 15 at the top of the regenerator and a solid material outlet 16 at the lower end thereof bearing a flow control valve 32. It will be understood that regenerators of other construction may be substituted for that shown within the scope of this invention as long as such modified constructions permit combustion regeneration of moving particles of spent contact mass materials at controlled elevated temperatures. Also shown in Figure 1 is a convertor 17, a supply hopper 18 located thereabove and conveyors 19 and 20 adapted to transfer hot catalyst particles between the regenerator and convertor vessels.

Across the upper section of vessel 17 and supported between flanges 21 and 22 is a partition 34 serving to divide vessel 17 into a lower conversion chamber 24 and an upper seal chamber 25. Extending downwardly from partition 34 and terminating within the upper section of said conversion chamber are a plurality of pipes 29 uniformly spaced apart with respect to the cross-sectional area of said conversion chamber. The pipes 29 serve as a passageway for contact material flow from the bottom of the accumulation 31 of said material in seal chamber 25 to the conversion chamber therebelow. Below the lower end of each pipe 29 is a small upright funnel 28 having a cross-section at its upper edge greater than that of the pipe 29 and having a depending drain spout of cross section substantially less than that of the pipe 29. These funnels are spaced sufficiently below the pipe 29 as to permit free access of the vapor in the conversion vessel to the surface of the contact material in the funnel at an area approximately equal to or greater than that of the pipe 29 cross section; and the funnels may be so supported by any of a number of suitable means such as rods 33. Connected into the top of seal chamber 25, extending a short distance down into section 25 and extending upwardly therefrom is the feed pipe 27. Supported below the lower end of this pipe by rod 30 is a funnel 26, similar to those described above and similarly placed with respect to the pipe thereabove, the downspout of said funnel terminating short of the partition 34. Connected also to the seal chamber 25 is the pipe 40 with diaphragm operated valve 41 thereon. Connected to the upper end of feed conduit 27 is the supply hopper 18, to the top of which hopper is connected a conduit 43 serving as a supply duct from conveyor 19. Also provided on the top of hopper 18 is a vent 44 with valve 45 thereon. The hopper 18 is located a sufficient distance above seal chamber 25 to cause the feed pipe 27 to be of sufficient vertical length to permit maintenance therein of a compact column of contact material having a head greater than the differential in pressure between the hopper 18 and the seal chamber 25. In other words, the pipe 27 is of sufficient length as to permit maintenance therein, when contact material flow from the bottom thereof is throttled, a substantially compact column of downwardly flowing particle form contact material, the weight of the contact material in the entire length of a unit cross section of said column being greater in pounds than the difference in gaseous pressure, in pounds per equal unit of cross section, between the lower and upper end of said column. Supported within the conversion chamber 24 directly below the outlet spout 47 from each throttling basin 28 is an inverted baffle 48 which may be preferably of inverted conical shape. At the lower end of the chamber 24 is a contact material withdrawal conduit 49 bearing an adjustable flow control valve 50. A level indicating mechanism is provided to indicate the level of the column of contact material within the conversion chamber and to activate mechanism controlling the adjustment of valve 50 so as to maintain the surface level of said column substantially constant. Any of several known types of level indicating and control arrangements may be employed within the scope of this invention. In the arrangement shown in Figure 1 there is provided a vertical rod 51 bearing vanes 52 suitably supported within the conversion chamber and extending through a short vertical section thereof. A gear 53 is provided at the upper end of rod 51 and this gear meshes with a second gear 55 provided on the end of a horizontal drive shaft 56. The shaft 56 is supported by enclosed bearings 57, and a stuffing box 58 is provided to prevent escape of gas from chamber 24. A shield 59 is provided to protect the gears 53 and 55 from the contact material particles. The mechanism is driven by a motor 54 connected to the end of drive shaft 56, and the arrangement is such that the rod bearing vanes 52 are continuously rotated within the column of contact material in chamber 24. The higher the surface of the column between the levels 35—35' and 60—60', the greater is the power requirement to drive the rod 51. A watt meter 61, specially calibrated to indicate the level of the contact material column is connected in the power line to motor 54. Also connected into the electrical circuit is a suitable electrical mechanism 62 activated by the fluctuation of power requirements for motor 54 to control the operation of a second motor 63 connected to flow control valve 50, so as to automatically adjust valve 50 to maintain a substantially constant column level within said conversion chamber, which level may be set anywhere within the operating range of the level indicating mechanism (i. e., between levels 35—35' and 60—60'). It will be understood that with the above level control arrangement there may occur certain minor fluctuations of the surface level of the contact material column within chamber 24 from the set level due to normal lag in the operation of the level control mechanism. However, such fluctuations will be normally limited to a short vertical section of the conversion chamber of the order of 2 to 3 feet or usually less in length. Within the upper section of the conversion chamber 24 approximately at the level of the funnels or throttling basins 28 is provided liquid charge inlet manifolding, comprising several branches, one of which 64 may be seen extending across the chamber 24 and the section of two other branches extending to other sections of the chamber cross section may be seen at 65 and 66. The manifolding is such as to be substantially uniformly distributed with respect to cross-sectional area of chamber 24, and the manifolding is supplied with liquid charge through inlet conduit 67. A number of spray nozzles 68 are arranged at intervals along the manifolding. An outlet 23 is provided for withdrawal of gaseous products from the lower section of the conversion chamber. Suitable gas-solid disengaging members may be provided within the chamber in association with outlet 23. Also provided is an inert gas inlet 69 at a level below that of outlet 23.

In operation, freshly regenerated contact material from regenerator 10 is conducted by conveyor 19 to chute 43 and thence into the supply hopper 18. The rate of supply is such in respect to the rate of contact material withdrawal from said hopper to permit maintenance of a bed of said contact material therein. It should be understood that any other means for maintaining an accumulation of contact material above the inlet of feed pipe 27 is equally applicable. For example, an enlarged continuation of supply duct 43 would also be suitable. The term "supply hopper" where used herein in describing and claiming this invention is used in this broad sense. The hopper 18 may or may not be vented to the air but is generally under a gaseous pressure below that maintained in seal chamber 25. The particle form contact material at suitable conversion supporting temperature flow from supply hopper 18 through feed pipe 27 onto the accumulation of contact material confined in the funnel 26. The contact material from the funnel 26 drains onto the accumulation 31 of contact material therebelow in the seal chamber. An inert seal gas is introduced through pipe 40 at a rate controlled by diaphragm operated valve 41 and differential pressure control instrument 70 sufficient to maintain the pressure in chamber 25 somewhat above that in the upper section of conversion chamber 24. The accumulation of contact material 31 and the substantially compact columns of contact material in pipes 29 sufficiently restrict the inert gas flow from chamber 25 to chamber 24, to permit maintenance of a differential pressure without requirements of undue quantities of seal gas and without passage of excessive amounts of seal gas into the conversion chamber. Since the funnel 26 is located sufficiently below the end of pipe 27 to provide a gas-solid contacting area at 71 which is approximately equal to or greater than the cross-sectional area of pipe 27, it can be seen that there is no restriction of cross section for gas flow near the point of throttling. As a result, the difficulties, hereinbefore described, encountered in throttling the flow of solid at the lower ends of feed pipes is eliminated. Also since the gas in chamber 25 has free access to the stream of contact material issuing from the downspout of the funnel 26 the pressure at this point is substantially the same as it is on the surface of contact material in the funnel so that there is no reason for gas flow through the funnel 26 and flow restricting downspout. The cross-sectional area of the funnel downspout is sufficiently less than that of the pipe 27 to limit the maximum possible rate of flow from the funnel below a volumetric rate that would correspond to free flow in the feed pipe 27, so that the accumulation of contact material in the funnel 26 is ever present to serve as a throttle on the contact material flow from pipe 24 regardless of fluctuations in pressure within chamber 25. Thus, the column of contact material is maintained compact at all times thereby preventing excessive flow of gas from chamber 25 upwardly through feed pipe 27. It will be understood that the purpose of the throttling funnel 26 is to insure maintenance of a substantially compact column of contact material throughout the length of feed pipe 27 and not to regulate the rate of contact material feed to the convertor. It is therefore generally undesirable to restrict the downspout of funnel 26 substantially more than is necessary to restrict the flow therethrough slightly below that corresponding to free flow in the feed pipe 27. The contact material passes from the accumulation 31 down through pipes 29 onto the accumulation of contact material in funnels 28. The placement of these funnels with respect to the lower ends of pipes 29 is similar to the placement of funnel 26 and the funnels operate in substantially the same way. The discharge spouts from the funnels 28 have the double function of insuring the maintenance of a substantially compact column of contact material throughout the length of pipes 29 and of controlling the rate of contact material charge to the conversion chamber. The downspouts of the funnels 28 therefore should be of such size as to have a total flow capacity equal to the predetermined total contact material charge rate to the conversion chamber. Each pipe 29 should be of such size in relation to the flow capacity of the throttling funnel therebelow, that the volumetric flow capacity of the funnel is substantially less than that rate corresponding to free flow in the pipe 29. The contact material particles discharging from funnels 28 fall onto the conical shaped baffles 48 therebelow and are dispersed thereby substantially uniformly over the entire cross-sectional area of the conversion chamber. The dispersed particles fall as a rain through the column-free section 72 of the conversion chamber onto the surface of the column of contact maintained therebelow within the conversion chamber. Contact material bearing a carbonaceous contaminant is withdrawn from the bottom of the conversion chamber through conduit 49 and valve 50 and passed into conveyor 20. The rate of contact material withdrawal is controlled by the level control mechanism acting upon the motor driven valve 50 as described hereinabove to maintain the surface level of the column within chamber 24 within a narrow range of levels all substantially below the baffles 48 so as to provide the column free space 72 within the upper section of the conversion chamber. The spent contact material is conducted by conveyor 20 to chute 15 supplying the regenerator. The contact material then passes downwardly through the regenerator wherein it is contacted at controlled elevated temperatures of the order of 900 to 1200° F. with a combustion supporting gas, such as air, introduced into the regenerator through inlet 11 and withdrawn as flue gas through outlet 13. High boiling liquid hydrocarbon charge, which may be heated in an external furnace (not shown) is introduced through inlet 67 into manifolding 64, 65 and 66. The liquid hydrocarbons then are sprayed into the conversion chamber at a level adjacent that of funnels 28 or near the level of baffles 48 so as to uniformly contact the raining particles of contact material within the column-free zone 72 before said particles reach the surface of the column of contact material therebelow. By this procedure uniform contacting of all of the catalyst particles with liquid hydrocarbon charge is insured, thereby permitting uniform conversion of all of the hydrocarbon charge and uniform contaminant deposition upon the contact material. Other means for spraying liquid oil into the column-free section of the conversion chamber may be employed within the scope of this invention. For example, an arrangement of perforated pipes may be substituted for the preferred manifold and nozzle arrangement shown. The spray nozzles may be so positioned as to spray the liquid oil into the contact material at a level immediately below where the contact material falls from the throttling funnel. On the other hand, the nozzles may be positioned so as to spray the liquid oil into the contact material as it falls as a uniformly distributed rain just below the baffles 48. In many operations an inert gas such as steam or even vaporizable hydrocarbons may be introduced through conduit 90 into inlet conduit 67 to be sprayed onto the contact material in the convertor along with the liquid hydrocarbons. Such a gas, for example steam, improves the spraying operation so as to permit better subdivision of the liquid oil droplets. Furthermore, such gas may be used to sweep the manifolding and nozzles free of liquid oil in the event of "shut down" or failure of the feed pump thus avoiding coking of the feed nozzles. The liquid hydrocarbons are converted to lower boiling, gasoline containing gaseous hydrocarbons within the chamber 25 and the gaseous products are withdrawn through outlet 23 and then passed into fractionating equipment (not shown). An inert purge gas such as steam or flue gas is introduced into the lower section of the conversion chamber through inlet 69. The purge gas provides an inert gaseous seal at the lower end of the conversion chamber and strips gaseous hydrocarbons from the outflowing contact material.

The construction shown in Figure 1 for provision of the seal zone 25 is a preferred form of this invention. In other forms the seal zone may be a separate chamber independent of the conversion vessel and located thereabove. In such modifications suitable modified means may be provided for passage of contact material from the seal zone to the feed pipes 29 feeding contact material into the conversion zone.

Figure 2:
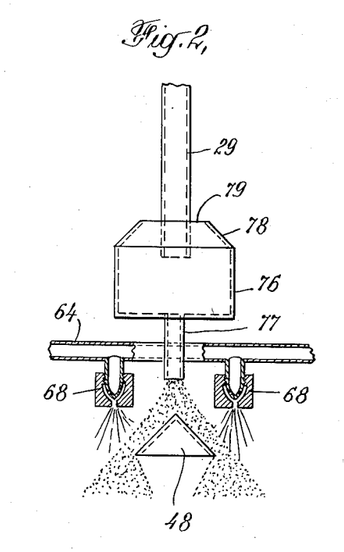
Figure 2 is an elevational view, partially in section showing details of a modified form of the invention and Figures 3 through 5, inclusive, are isometric views of other modified forms of the solid flow throttling portion of the invention. All of these drawings are highly diagrammatic in form.

The means of throttling the contact material flow within feed pipes may take a number of forms other than that shown in Figure 1. For example, in Figure 2 is shown the lower end of a contact material feed pipe 29 to a conversion chamber (not shown) extending part-way down into a cylindrical shaped vessel 76 having a drain pipe 77 dependent from its bottom and being partly closed above by a frustum shaped top 78 having a hole 79 in the center thereof. Contact material is withdrawn through pipe 77 at a predetermined fixed rate which is substantially below that corresponding to free flow in pipe 29 and which is insufficient to lower the level of the accumulation of contact material confined within the cylindrical vessel 76 below the end of pipe 29, so that the flow from pipe 29 is always throttled, thereby maintaining a substantially compact column of contact material therein. A conical baffle 48 is positioned below the outlet to disperse the solid particles. It will be apparent that the funnels 28 in Figure 1 may be replaced by throttling means of the type shown at 76 in Figure 2. Also shown in Figure 2 is a section of the liquid hydrocarbon inlet manifolding 64 and spray nozzles 68 depending therefrom.

Figure 3:
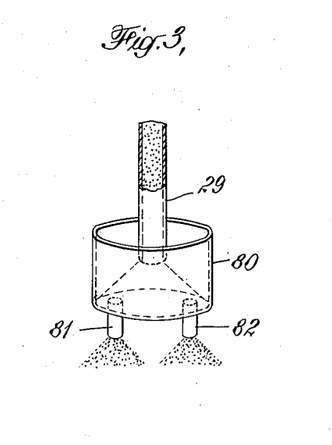

More than one drain pipe may be used on the throttling basin provided that the total capacity for contact material flow therethrough is substantially less than that corresponding to free flow in the pipe from which the contact material is throttled in the case of throttling basins on conversion chamber feed pipes. Moreover, the total capacity for contact material flow from all of the basins feeding a conversion chamber should be equal to the desired total charge rate to said chamber. Such an arrangement is shown in Figure 3 in which 29 is a feed pipe to a conversion chamber, and 80 is the means for confining a throttling accumulation of contact material therebelow and in which 81 and 82 are two spaced apart drain pipes therefrom having a total contact material flow capacity substantially below that corresponding to free flow in conduit 29 and equal to the desired contact material charge rate to the conversion zone.

Figure 4:
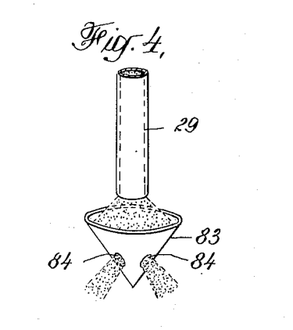

In Figure 4 is shown another arrangement in which an inverted cone 83 is used as the means for confining an accumulation of particle form solid material below pipe 29. Solid material passes from the cone through a plurality of symmetrically placed orifices 84 in the sides thereof, said orifices having less solid flow capacity than that corresponding to free flow in pipe 29.

Figure 5:
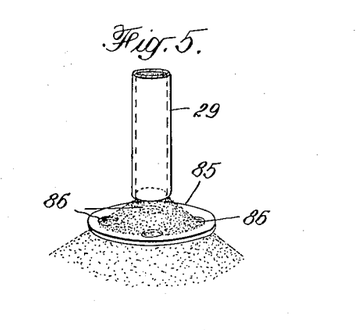

A still simpler form of the flow throttling portion of this invention is shown in the isometric drawing of Figure 5 in which 29 represents the lower end of a solid material feed pipe to a conversion zone and in which 85 is a flat horizontally extending plate having a horizontal cross section somewhat greater than that of said pipe and supported by a suitable means (not shown) a short distance below the end of said pipe. The diameter of the plate and the distance of the plate below the end of the pipe 29 are controlled so that the solid material issuing from the pipe 29 onto the plate will not, due to its normal angle of repose, flow over the edge of the plate. A similar specification should be closely followed for all the modifications of the invention. In other words, the plate or the upper edge of the cone, basin or funnel should be so positioned with respect to the lower end of the solid material feed or drain pipe thereabove that a line extended downwardly from the periphery of the lower end of said pipe, at an angle not greater than the normal surface angle of repose of an accumulation of the particular solid material particles involved, should meet the horizontal plane through said plate or through the upper edge of said funnel, cone or basin at a point within the area covered thereby. Thus, there is maintained on the plate an accumulation of solid material onto which the solid material from pipe 36 flows and which throttle the flow of said solid material from said pipe, thereby maintaining it substantially filled with a substantially compact column of particle form solid material. Solid material is withdrawn from the accumulation of contact material on plate 85 through a number of orifices 86 therein, the total solid material flow capacity being substantially less than the quantity of flow corresponding to free solid material flow in the pipe 29 and equal to the desired charge rate.

In all of the above modifications of the method and apparatus of this invention the same functions and results are accomplished in essentially the same fundamental way. Contact material at a suitable conversion supporting temperature is introduced into a conversion zone through feed pipes which are throttled adjacent their lower ends by a separate accumulation of contact material. Contact material is withdrawn from these accumulations at a predetermined volumetric rate, the rate from any throttling accumulation being substantially below that corresponding to free flow in the feed pipe thereabove and the total rate from all the accumulation being equal to the desired charge rate to the conversion chamber. Gaseous pressure is equalized on either side of the throttling accumulation so that there is no tendency for gas flow through the restricted zones for contact material flow. This eliminates the difficulties arising from gas flow through a flow throttling zone described hereinabove and permits control of a constant rate of contact material charge which is independent of pressure fluctuations in the conversion chamber and in the similarly fed seal chamber thereabove. The contact material withdrawn from the throttling accumulations is then permitted to rain downwardly through a column-free section of the conversion chamber wherein it is uniformly contacted with a spray of high boiling liquid hydrocarbon charge. Baffling may be provided, when needed, to more uniformly disperse the falling solid particles over the entire cross-sectional area of the conversion chamber. The contact material particles having been uniformly contacted with liquid hydrocarbons in the column-free section of the conversion chamber then fall onto the surface of a substantially compact column of contact material maintained therebelow in the conversion zone and the contact material and hydrocarbons then pass downwardly through the conversion zone thereby effecting the conversion of said liquid hydrocarbons to lower boiling gaseous hydrocarbon products. The gaseous products are disengaged from the contact material and withdrawn from the lower section of the conversion chamber and the contact material is withdrawn from the lower end thereof at a rate controlled to maintain the surface of the column within the conversion zone within a fixed narrow range of levels all substantially below that of the throttling accumulations and baffling thereunder.

The length of column which should be maintained within the conversion chamber may vary somewhat depending upon the particular materials, operation and operating conditions involved. In general the column within the conversion chamber should be of the order of four feet to forty feet in depth. The length of the column-free section of the conversion chamber above the contact material column should be in general greater than about two feet.

The particular operating conditions within the conversion zone may vary widely from one application to another. In some operations the liquid hydrocarbon charge may be introduced cold to the conversion chamber, but it is generally preferable to heat the liquid charge to a temperature of the order of about 600–850° F. before spraying it into the conversion chamber. The contact material should be introduced into the conversion chamber at a temperature suitable to support the desired conversion without the contact material being cooled to a temperature below that at which hydrocarbon conversion proceeds at a practical rate. The contact material inlet temperature may vary from about 950° F. to 1200° F. depending upon the operation. The ratio of contact material to liquid oil charge to the conversion chamber may be within the range of about 1.5 to 20 parts of contact material by weight per part of oil. The oil space velocity through the conversion zone measured as volumes of liquid oil (measured at 60° F.) per volume of contact material in the conversion chamber (measured as a compact flowing mass) may fall within the range 0.2 to 5.0 volumes of oil per hour per volume of contact material.

It should be understood that all of the foregoing illustrations and examples of the method and apparatus of this invention are intended merely as illustrative and are in no way to be construed as limiting the scope of this invention except as it may be limited by the following claims.

I claim:

1. In a process for conversion of a high boiling liquid hydrocarbon charge to lower boiling gaseous hydrocarbon products in the presence of a moving mass of hot particle form contact material the method for introduction of solid material and liquid hydrocarbon charge into a confined conversion zone which comprises: flowing said particle form contact material into the upper section of a confined, elongated conversion zone in a plurality of substantially compact, elongated streams uniformly distributed across the cross-sectional area of said zone, throttling the flow of said solid material in each of said streams at locations adjacent the lower ends thereof so as to limit the volumetric flow therein substantially below that corresponding to free flow in said streams, while maintaining free gaseous communication between the upper section of said conversion zone and the solid material in said compact streams above the location of throttling, raining said solid material from said locations of throttling through a short vertical section of said conversion zone onto the surface of a substantially compact column of contact material maintained therebelow within said conversion zone, and spraying high boiling liquid hydrocarbon charge onto said raining contact material in said short section of said conversion zone.

2. A process for conversion of high boiling liquid petroleum fractions to lower boiling gaseous products which comprises: introducing particle form solid materials at a suitable hydrocarbon conversion temperature into the upper section of a confined conversion zone as a plurality of uniformly spaced, substantially compact confined columns of downwardly moving particles, said columns having a total cross-sectional area substantially less than that of said conversion zone, restricting the volumetric rate of flow of said contact material near the lower end of each of said columns to a set rate which is substantially below that corresponding to free flow in said columns, while permitting free access of pressure existing in said conversion zone to each of said columns above the location of flow restriction, passing said contact material as uniformly dispersed, freely falling particles through a vertical mixing space in said conversion zone onto a substantially compact column of said contact material maintained within said conversion zone therebelow, withdrawing contact material from the lower end of said conversion zone at a rate controlled to maintain said column to a substantially fixed level within said zone, spraying said high boiling liquid petroleum fraction uniformly into said mixing space to contact said freely falling particles therein and withdrawing lower boiling gaseous hydrocarbon products from the lower section of said conversion zone.

3. A continuous process for catalytic conversion of a high boiling liquid hydrocarbon charge to lower boiling gaseous hydrocarbon products which comprises: passing regenerated particle form contact material at a suitable temperature for hydrocarbon conversion from a supply zone as a substantially compact, confined column of downwardly moving particles onto an accumulation of contact material in a pressure seal zone located therebelow, said seal zone being under a gaseous pressure substantially above that in said supply zone and being located sufficiently below said supply zone to permit a head of contact material in said column substantially greater than the differential pressure between said supply zone and said seal zone, flowing contact material from the bottom of said accumulation in said seal zone, as a plurality of substantially compact elongated streams of contact material into the upper section of a conversion zone therebelow, throttling the flow of contact material from said streams at an equal plurality of locations adjacent the lower ends thereof so as to control the rate of contact material flow from each stream at a fixed rate which is substantially below the possible volumetric rate of free flow in said stream, while permitting free access of pressure existing in the upper section of said conversion zone to said streams above said locations of throttling, passing said contact material from said locations of flow throttling downwardly through a vertical mixing space as a rain of particles uniformly dispersed across the cross-sectional area of said mixing space onto the surface of a substantially compact column of said contact material maintained therebelow within said conversion zone, introducing heated high boiling liquid hydrocarbon charge into said mixing space as a uniformly distributed spray to wet said contact material before reaching said column within said conversion zone, withdrawing lower boiling gaseous hydrocarbon products from the lower section of said zone, introducing an inert seal gas into said seal zone to maintain a pressure therein above that in said conversion zone, introducing an inert purge gas into said conversion zone below the level of said gaseous hydrocarbon withdrawal to purge gaseous hydrocarbons from the contact material, withdrawing spent, contaminant bearing contact material from the bottom of said zone at a rate equal to the total rate of contact material flow from said plurality of compact streams into said mixing space, passing said spent contact material through a separate regeneration zone to accomplish the burning off of said contaminant at controlled elevated temperatures and passing said regenerated contact material to said supply zone.

4. In a process for conversion of a high boiling liquid hydrocarbon charge to lower boiling hydrocarbon products in the presence of a mass of moving particle form contact material the method for introduction of contact material and liquid hydrocarbon charge into a conversion zone which comprises: passing said particle form contact material as a plurality of uniformly spaced, substantially compact, elongated streams of downwardly moving particles onto an equal plurality of accumulations of said contact material within the upper section of said conversion zone, said accumulations serving to throttle the flow of said contact material from said streams; withdrawing contact material from the bottom of each of said accumulations at a fixed volumetric rate which is substantially below that corresponding to free flow in the compact stream supplying said accumulation, while freely exposing the surface of said accumulations and the locations of solid withdrawal therefrom to the pressure within said conversion zone; passing said contact material withdrawn from said accumulations as a rain of falling particles substantially uniformly distributed over the cross-sectional area of said conversion zone downwardly through a short, column-free section of said conversion zone onto the surface of a substantially compact column of said contact material maintained therebelow within said conversion zone; and spraying high boiling liquid hydrocarbon charge onto said rain of contact material within said column-free section of said conversion zone so as to accomplish the uniform contacting of contact material particles with said liquid hydrocarbon charge before said particles reach said column of contact material.

5. A process for conversion of high boiling liquid petroleum fractions to lower boiling gaseous products which comprises: passing particle form contact material at a temperature suitable for supporting the hydrocarbon conversion and as a plurality of substantially compact, confined, uniformly spaced columns of downwardly flowing particles onto an equal plurality of accumulations of said contact material positioned within the upper section of a confined, elongated conversion zone, said accumulations serving to throttle the flow of contact material from said columns and having at their broadest point a cross-sectional area greater than that of said columns and a total cross-sectional area substantially less than that of said conversion zone; withdrawing a plurality of streams of said contact material from each of said accumulations at locations symmetrically located with respect to the column supplying each accumulation, the total volumetric rate of contact material flow in said plurality of streams from each accumulation being positively controlled to a fixed rate substantially below the possible rate of supply of contact material from the column supplying that accumulation, while freely exposing the surfaces of said accumulations and the withdrawal streams therefrom to the gaseous pressure within said conversion zone; permitting the contact material from said plurality of streams to drop through a column-free vertical section of said conversion zone onto the surface of a substantially compact column of said contact material maintained therebelow within said conversion zone, introducing a heated high boiling liquid petroleum fraction into said column-free section of said conversion zone as a uniformly distributed spray to contact said particles of contact material before reaching said column of contact material within said conversion zone, withdrawing lower boiling gaseous conversion products from the lower section of said column in said conversion zone and withdrawing spent contact material from the bottom of said column at a rate so controlled with relation to the total rate of contact material withdrawal from all of said accumulations as to maintain the surface level of said column in said conversion zone within a relatively narrow fixed range of levels below the level of contact material withdrawal from said accumulations.

6. In a process for conversion of a high boiling liquid hydrocarbon charge to lower boiling hydrocarbon products in the presence of a mass of moving particle form contact material the method for introduction of contact material and liquid hydrocarbon charge into a conversion zone which comprises: passing said particle form contact material as a plurality of uniformly spaced, substantially compact, elongated streams of downwardly moving particles onto an equal plurality of accumulations of said contact material within the upper section of said conversion zone, said accumulations serving to throttle the flow of said contact material from said streams; withdrawing contact material from the bottom of each of said accumulations at a fixed volumetric rate which is substantially below that corresponding to free flow in the compact stream supplying said accumulation, while freely exposing the surface of said accumulations and the locations of solid withdrawal therefrom to the pressure within said conversion zone; baffling the flow of contact material from said accumulations so as to distribute the contact material particles uniformly over the entire cross-sectional area of said conversion zone and permitting said particles to fall as a rain of dispersed particles downwardly through a vertical mixing space within said conversion zone into the surface of a substantially compact column of said contact material maintained therebelow within said conversion zone; introducing high boiling liquid hydrocarbon charge in a heated condition into said mixing space as a uniform liquid spray so as to uniformly contact said contact material particles before reaching said column of contact material.

7. A process for conversion of high boiling liquid petroleum fractions to lower boiling gaseous products which comprises: passing particle form contact material at a temperature suitable for supporting the hydrocarbon conversion and as a plurality of substantially compact, confined, uniformly spaced columns of downwardly flowing particles onto an equal plurality of accumulations of said contact material positioned within the upper section of a confined, elongated conversion zone, said accumulations serving to throttle the flow of contact material from said columns and having at their broadest point a cross-sectional area greater than that of said columns and a total cross-sectional area substantially less than that of said conversion zone; withdrawing at least one stream of contact material from each of said accumulations at a fixed volumetric rate which is substantially below that corresponding to free flow of contact material in the column supplying said accumulations, and such that the total flow from all of said accumulations amounts to the predetermined suitable contact material total charge rate to said conversion zone, while freely exposing the surfaces of said accumulations and said withdrawal streams to the pressure within said converion zone, baffling the flow of said streams so as to disperse contact material particles substantially uniformly over the entire cross-sectional area of said conversion zone and permitting said dispersed particles to freely fall through a column-free vertical section of said conversion zone onto the surface of a substantially compact column of said contact material maintained therebelow within said conversion zone, introducing a heated high boiling liquid petroleum fraction into said column-free section of said conversion zone as a uniformly distributed spray to contact said particles of contact material before reaching said column of contact material within said conversion zone, withdrawing lower boiling gaseous conversion products from the lower section of said column in said conversion zone and withdrawing spent contact material from the bottom of said column at a rate so controlled with relation to the total rate of contact material withdrawal from all of said accumulations as to maintain the surface level of said column in said conversion zone within a relatively narrow fixed range of levels substantially below the level of contact material withdrawal from said accumulations.

8. In an apparatus for conversion of high boiling liquid hydrocarbon charges to lower boiling hydrocarbon products in the presence of a moving particle form contact material, means defining an elongated substantially vertical conversion chamber adapted to confine a substantially compact column of particle form contact material; a plurality of uniformly spaced conduits extending downwardly into the upper section of said conversion chamber for supply of contact material thereto; separate flow throttling means adjacent the lower end of each of said conduits adapted to limit the rate of catalyst flow from each conduit substantially below that corresponding to free flow, means to equalize gaseous pressure at locations immediately above and immediately below said flow throttling means; means to withdraw contact material from the bottom of said chamber at a rate controlled to maintain the surface of a substantially compact column of contact material within said chamber within a narrow range of levels all a substantial vertical distance below said separate flow throttling means, and means to spray high boiling liquid oil onto the contact material falling from said separate throttling means.

9. An apparatus for conversion of high boiling liquid hydrocarbons in the presence of a particle form solid contact mass material which comprises: means defining a substantially vertical, elongated conversion chamber; a plurality of ducts depending into the upper section of said chamber, said ducts being uniformly distributed over the entire cross-sectional area of said chamber; a separate fixed flow throttling means near the lower extremity of each of said ducts adapted to control the solid material flow from each duct at a fixed rate and to maintain the solid material thereabove in each conduit as a substantially compact column; means providing free access of the gaseous pressure within the upper section of said conversion chamber to points both above and below each of said fixed flow throttling means; an outlet conduit for contact material at the lower end of said conversion chamber; flow control means associated with said outlet conduit adapted to regulate the contact material flow through said outlet conduit such as to maintain said contact material within said conversion chamber as a substantially compact column up to a substantially constant level, which level is substantially below the level of said fixed flow throttling means; means to spray high boiling liquid hydrocarbon charge downwardly into the upper section of said conversion chamber adjacent said fixed flow throttling means; and means to withdraw gaseous conversion products from the lower section of said conversion chambers.

10. An apparatus for conversion of high boiling liquid hydrocarbons in the presence of a moving particle form solid contact material which comprises: a substantially vertical, elongated conversion chamber; a plurality of uniformly spaced, vertical conduits for contact material supply depending from the top of said chamber and terminating within the upper section thereof; separate means adjacent the lower end of each of said conduits to positively throttle the flow of contact material therefrom, said throttling means providing substantially more restriction to contact material flow than the conduit associated therewith under existing operating conditions; means to maintain substantially equal gaseous pressure above and below said separate flow throttling means; an outlet conduit for contact material withdrawal from the bottom of said chamber; adjustable flow throttling means associated with said outlet conduit, adapted to maintain a substantially compact column of said contact material within said conversion chamber; a level indicating mechanism adapted to indicate the surface level of said column along a fixed vertical section of said chamber at a spaced vertical distance below said separate throttling means; a mechanism actuated by said level indicating mechanism to adjust said flow throttling means associated with said outlet conduit so as to maintain the surface of said column within said chamber within the level range of said level indicating mechanism; uniformly distributed spray nozzles positioned within the upper section of said chamber substantially above said level indicating mechanism; manifolding to introduce liquid hydrocarbon charge into said spray nozzles; and means to withdraw gaseous hydrocarbon products from the lower section of said chamber.

11. An apparatus according to claim 10 with the further improvement of baffling within the upper section of said conversion chamber below the level of said separate flow throttling means adapted to disperse the contact material particles from said flow throttling means substantially uniformly over the cross-sectional area of said conversion chamber.

12. In an apparatus for conversion of high boiling hydrocarbon charges to lower boiling hydrocarbon products in the presence of a moving particle form contact material, means defining an elongated substantially vertical conversion chamber adapted to confine a substantially compact column of particle form contact material; a plurality of uniformly spaced conduits extending downwardly into the upper section of said conversion chamber for supply of contact material thereto; means to substantially restrict the free internal cross-sectional area of each of said conduits at at least one location near the lower end thereof; means to provide free access of the gaseous pressure within said chamber to a location in each of said conduits above each of said restricting means; baffling below the lower ends of said conduits adapted to substantially uniformly disperse the contact material flow from said conduits over the horizontal cross-sectional area of said conversion chamber; level indicating mechanism adapted to indicate the approximate surface level of said column of contact material throughout a fixed vertical section of said chamber, said vertical section being vertically spaced below said baffling; an outlet conduit for contact material withdrawal on the bottom of said conversion chamber; adjustable flow throttling means associated with said outlet conduit; and means to spray high boiling liquid oil onto the contact material falling from said baffling to the surface of said column of contact maintained material within said conversion chamber therebelow.

13. In an apparatus of the type described: a substantially upright elongated vessel; a partition across the upper section of said vessel dividing it into an upper seal chamber and a lower conversion chamber; means to introduce an inert seal gas into the upper end of said seal chamber; a longitudinal contact material feed conduit connected near the upper end of said vessel and extending upwardly therefrom; a supply hopper connected to the upper end of said conduit; means to supply particle form contact mass material to said hopper at a rate sufficient to maintain a bed of contact material therein; means confining an accumulation of said contact material within said seal chamber, adjacent the lower end of said conduit, said confining means being open on top for access of contact material from said feed conduit and for access of gaseous pressure within said seal chamber, onto the surface of said accumulations of contact material, said confining means having a horizontal cross-sectional area near its top substantially greater than that of said feed conduit and substantially less than that of said seal chamber; at least one outlet from the bottom of said confining means for flow of contact material from said accumulations onto a bed of such contact material maintained therebelow in said seal chamber, said outlet providing substantially more restriction to contact material flow than said feed conduit; a plurality of spaced apart pipes depending from said partition and terminating within the upper section of said conversion chamber; means confining an accumulation of said contact material adjacent the lower end of each of said pipes, each of said last named confining means being open on top for access of contact material from the pipe thereabove and for access of gaseous pressure within said conversion chamber and each of said confining means having a cross-sectional area near its top greater than that of the pipe thereabove and all of said last named confining means having a total cross-sectional area substantially less than that of said conversion chamber; at least one outlet from the bottom of each of said last named confining means, said outlet for any confining means providing fixed restrictions to contact material flow which is substantially greater than the restrictions to flow in the pipe supplying said confining means; baffling below said last named confining means to disperse the contact material particles flowing therefrom uniformly over the cross-sectional area of said conversion chamber; an outlet conduit for contact material withdrawal from the lower end of said conversion chamber; flow control means associated with said outlet means to permit maintenance of a substantially compact column of contact material within said conversion zone; a level control mechanism associated with said flow control means to automatically adjust said flow control means so as to maintain the surface level of said column of contact material within a short vertical section of said conversion chamber, said section being a spaced vertical distance below said baffling; spray nozzles within the upper section of said conversion chamber below the lower ends of said pipes depending thereinto and above said short vertical section wherein the level of said surface is maintained; manifolding for supply of liquid charge to said spray nozzles; and means to withdraw gaseous products from the lower section of said conversion chamber.

14. In an apparatus for conversion of a high boiling liquid hydrocarbon charge to lower boiling hydrocarbons in the presence of a mass of moving contact material particles, means defining an elongated, vertical conversion chamber; a plurality of uniformly spaced apart contact material supply conduits extending downwardly into the upper section of said conversion chamber; below the lower end of each of said conduits a separate basin, open on top, supported within said conversion chamber, said basin having downwardly sloping converging sides, and having a horizontal cross-sectional area at its widest point greater than that of said pipe, and being positioned sufficiently near the lower end of the conduit thereabove to prevent the overflow of contact material from said basin, said converging sides of each of said basins having at least one outlet for contact material therein, the total cross-sectional area of such outlets in any one basin being substantially less than that of the conduit thereabove; and outlet conduit for contact material withdrawal from the lower end of said conversion chamber; adjustable flow throttling means associated with said outlet conduit; a level control mechanism to control the adjustment of said throttling means so as to maintain said conversion chamber substantially filled with a compact mass of contact material particles up to a substantially constant level, which level is substantially below that of said basins; means to introduce high boiling liquid hydrocarbon charge into the upper section of said conversion chamber and near the level of said basins therein; means to withdraw gaseous hydrocarbon conversion products from the lower section of said chamber.

15. In an apparatus for conversion of a high boiling liquid hydrocarbon charge to lower boiling hydrocarbons in the presence of a mass of moving contact material particles, means defining an elongated, vertical conversion chamber; a plurality of uniformly spaced apart contact material supply conduits extending downwardly into the upper section of said conversion chamber; a plurality of basins supported within the upper section of said conversion chamber, one basin adjacent the lower end of each of said conduits, the total horizontal cross-sectional area of said basins being substantially less than that of said conversion chamber; each of said basins having side walls impervious to the lateral flow of contact material and extending upwardly above the lower end of the conduit thereabove, and said walls confining an accumulation of contact material of horizontal cross-sectional area substantially greater than that of said conduit thereabove, and each of said basins being substantially open on top so as to permit free access of the gaseous pressure in said conversion chamber to the surface of the accumulation of contact material therein, and each of said basins having a bottom with a plurality of uniformly spaced apart outlets therein, said outlets being in free access to the gaseous pressure in said conversion chamber and being sufficiently restricted in size to limit the rate of contact material flow from said basin to a set value substantially below that corresponding to free flow in the conduit above said basin, an outlet conduit for contact material withdrawal from the lower end of said conversion chamber; adjustable flow throttling means associated with said outlet conduit; a level control mechanism to control the adjustment of said throttling means so as to maintain said conversion chamber substantially filled with a compact mass of contact material particles up to a substantially constant level, which level is substantially below that of said basins; means to introduce high boiling liquid hydrocarbon charge into the upper section of said conversion chamber and near the level of said basins therein; means to withdraw gaseous hydrocarbon conversion products from the lower section of said chamber.

16. In an apparatus for conducting catalytic conversion of a high boiling liquid hydrocarbon charge to lower boiling hydrocarbons, a conversion chamber adapted for operation under pressure; a second chamber located above said conversion chamber; means to continuously supply particle form catalyst to said second chamber at a rate sufficient to maintain a bed of such catalyst therein and means to maintain an inert gaseous pressure therein substantially higher than the pressure in said conversion chamber; a plurality of uniformly spaced apart conduits depending from the bottom of said second chamber for passage of catalyst therefrom, said conduits terminating within said conversion chamber below the upper end thereof; a separate perforated plate supported in said conversion chamber a short distance below the end of each of said conduits and symmetrically thereunder, any given plate being of sufficient horizontal cross-section that a line extended from any point on the inner periphery of the outlet end of the conduit thereabove downwardly and at an angle equal to the angle of repose of said particle form contact material will not intersect the horizontal plane of said plate beyond the edges thereof, said perforations in each of said plates being of sufficient size to permit the flow therethrough of said contact material and the total cross-sectional area of said perforations in any given plate being such as to limit the contact material flow therethrough below that which would substantially reduce the accumulation of said solid on said plate; an outlet conduit for contact material flow from the bottom of said conversion chamber; flow control means associated with said outlet conduit adapted to control the rate of contact material flow from said conversion chamber such as to maintain contact material as a substantially compact column up to a substantially constant level within said conversion chamber, said level being a substantial vertical distance below said plates, means to introduce a spray of high boiling liquid hydrocarbons into said conversion vessel adjacent said plates and means to withdraw gaseous hydrocarbon products from the lower section of said conversion chamber.

17. In an apparatus for conversion of liquid hydrocarbon charges to lower boiling gaseous hydrocarbon products in the presence of a substantially compact mass of moving particle form contact material, a substantially vertical elongated conversion chamber adapted to permit operation under gaseous pressure; above said conversion chamber a smaller seal chamber adapted to confine a bed of said particle form contact material therein; means to introduce an inert seal gas into said seal chamber at a rate sufficient to maintain a small positive pressure differential in said seal chamber above the pressure in the upper section of said conversion chamber; an elongated substantially vertical contact material feed conduit connected through the top of said seal chamber and extending upwardly therefrom a sufficient vertical distance to permit maintenance therein of a column of said particle form contact material having a greater pressure head than the gaseous pressure in said seal chamber; a supply hopper connected to the upper end of said feed conduit; a plurality of spaced apart conduits depending from the bottom of said seal chamber for passage of contact material therefrom, said conduits being uniformly distributed with respect to the horizontal cross-sectional area of said conversion chamber and terminating all at substantially the same level within the upper section of said conversion chamber; an equal plurality of spaced apart basins supported within the upper section of said conversion chamber, one basin below each of said conduits, said basins having downwardly sloping converging sides and having a horizontal cross-sectional area at their broadest plane substantially greater than that of the conduits thereabove and said basins being positioned sufficiently near to the lower ends of said conduits to prevent the overflow of contact material over the edges of said basins; at least one outlet from the underside of each of said basins for contact material flow therefrom, said outlets being sufficiently restricted in size to limit the rate of contact material flow from said basins below that corresponding to free flow in the conduits thereabove, baffling below said outlets adapted to distribute the contact material particles falling through said outlets substantially uniformly over the entire cross-sectional area of said conversion chamber; an outlet duct for contact material withdrawal at the lower end of said conversion chamber; adjustable flow control means associated with said outlet duct to permit maintenance of a substantially compact column of said contact material within said conversion chamber; a level control mechanism adapted to automatically adjust said flow control means so as to maintain the level of the top of said column of contact material within said conversion chamber substantially a fixed vertical distance below said baffling; means to introduce high boiling liquid hydrocarbon charge into said conversion chamber as a liquid spray near the level of said baffling; means to withdraw gaseous hydrocarbon products from the lower section of said conversion chamber; and means to introduce an inert purge gas into said conversion chamber below the level of said gaseous product withdrawal means.

18. In a process wherein a fluid hydrocarbon is contacted with a particle-form solid material maintained as a column in a confined zone the improved method for supplying solid material and fluid hydrocarbon to said column which comprises: introducing the particle-form solid material into the upper section of said confined zone substantially above the surface level of said column of solid material therein, passing said solid material downwardly through an upper portion of said zone as a shower of dispersed freely falling particles onto the surface of said column and spraying the fluid hydrocarbon into said shower of solid material above the surface of said column and flowing said fluid hydrocarbon downwardly into and through at least a portion of said column.

19. In a process wherein liquid hydrocarbons are brought into contact in a confined zone with a substantially compact column of particle-form solid material the improved method which comprises: introducing the particle-form contact material into the upper section of said confined zone at a level substantially above the surface of said column within said zone, showering said contact material as uniformly dispersed freely falling particles downwardly through a vertical section of said zone onto the surface of said column, spraying the liquid hydrocarbons substantially uniformly into said conversion zone above the level of said column to become deposited upon said showering contact material particles before they reach said column, flowing the hydrocarbons downwardly within said column, withdrawing used contact material from the lower end of said column and controlling the level of the surface of said column substantially constant.

20. In a process wherein high boiling liquid hydrocarbons are brought into contact in a confined zone with a heated particle form solid material to effect conversion of said hydrocarbons to lower boiling products the improved method which comprises: maintaining a substantially compact bed of said solid material in a lower portion of a confined conversion zone, introducing heated particle form solid material into the upper section of said confined zone substantially above the surface level of said bed, passing said solid material downwardly through an upper portion of said zone as a shower of freely falling particles onto the surface of said column, spraying the high boiling liquid hydrocarbons into said shower of heated solid particles above the surface of said bed, flowing liquid and resulting vapor hydrocarbons downwardly within said bed and withdrawing lower boiling conversion products from said bed below its surface separately of the solid material, withdrawing the solid material from the lower section of said bed and controlling the surface level of said bed substantially constant.

21. A process for converting liquid hydrocarbons to valuable gasiform products in the presence of a particle form contact material which comprises maintaining a substantially compact bed of particle form contact material in a confined conversion zone, effecting a uniform contacting of particle form contact material existing at a suitable conversion supporting temperature with the hydrocarbon charge existing initially in the liquid phase in a contacting region apart from said bed and then delivering the uniformly contacted contact material and liquid hydrocarbons to the surface of said bed, moving the uniformly contacted particles and liquid hydrocarbons downwardly within said bed to effect completion of the desired conversion of the liquid hydrocarbons to gasiform products, withdrawing said gasiform products from said conversion zone and withdrawing contact material from the bottom of said conversion zone separately of said gasiform products.

22. A process for converting high boiling liquid hydrocarbons to lower boiling gasoline containing products in the presence of a particle form contact material which comprises, maintaining a substantially compact column of particle form contact material in a confined conversion zone, withdrawing contact material from the lower section of said column to promote downward flow of particles in the column, uniformly contacting fresh contact material existing at a temperature suitable for supporting said hydrocarbon conversion with a high boiling liquid hydrocarbon reactant in a region above said column and in flow communication therewith, passing the contacted contact material and liquid hydrocarbon reactant downwardly onto said column whereby the column is replenished with contact material, flowing any hydrocarbon reactant existing in the liquid phase downwardly through a substantial portion of said column with the contact material until it is converted to a gasoline containing product existing in the vapor phase, disengaging the vapor product from the contact material and withdrawing it from said conversion zone.

23. A process for converting liquid hydrocarbons to valuable gasiform products in the presence of a particle-form contact material which comprises, maintaining a substantially compact bed of particle-form contact material in a confined conversion zone, bringing the liquid hydrocarbon charge in the liquid phase into an initial contact with particle-form contact material existing at a suitable conversion supporting temperature in a region apart from said bed and then delivering the initially contacted contact material and hydrocarbons to said bed, withdrawing contact material from the bottom of said bed to promote downward flow of the particles in said bed, flowing the liquid hydrocarbons downwardly through a substantial portion of said bed to effect completion of the desired conversion to gasiform products and withdrawing gasiform products from said bed.

24. A process for converting high boiling liquid hydrocarbons to lower boiling gasoline containing products in the presence of a particle form contact material which comprises, maintaining a substantially compact column of particle form contact material in a confined conversion zone, withdrawing contact material from the lower section of said column to promote downward flow of particles in the column, uniformly contacting fresh contact material existing at a temperature suitable for supporting said hydrocarbon conversion with a high boiling liquid hydrocarbon reactant in a column-free zone above the surface of said column and in flow communication therewith, flowing the contacted contact material and the hydrocarbon reactant downwardly to the surface of said column whereby the column is replenished with contact material, flowing the hydrocarbon reactant downwardly through a substantial portion of said column to complete the conversion to a gasoline containing product existing in the vapor phase, then disengaging the vapor product from the contact material and withdrawing it from said conversion zone at a level substantially below the column surface.

25. A process for conversion of high boiling liquid hydrocarbons to lower boiling products in the presence of a particle form contact material which comprises, maintaining a laterally confined substantially compact column of particle form contact material, withdrawing contact material from the bottom of said column to promote downward movement of the particles in the column, causing contact material having conversion temperature to pour through a flow throttling passage into a confined column free zone above said bed and causing said contact material to gravitate in non-columnar fashion down through said cofined zone onto the surface of said column, spraying a high boiling liquid hydrocarbon charge onto the gravitating particles before they reach the surface of said column, flowing resulting liquid and vaporous hydrocarbons downwardly through a substantial portion of said column to complete the conversion to gasiform products and withdrawing gasiform products from said column separately of the contact material.

26. In the art of converting hydrocarbons involving the utilization of a bed of contact material which gravitates through a housing, the steps which comprise, causing regenerated contact material having conversion temperature to gravitate toward and eventually reach the upper surface of said bed, controlling the regenerated contact material so that it forms a freely falling shower of contact material, directing a spray of liquid hydrocarbon material onto the showering contact material, mixing the contact material which has thus been engaged with liquid material prior to arrival thereof at the upper surface of said bed, flowing the hydrocarbon material downwardly within said bed and withdrawing gasiform conversion products from said bed below the surface thereof and withdrawing contact material from the lower section of said bed.

27. In the art of converting hydrocarbons involving the utilization of a bed of contact material which gravitates through a housing, the steps which comprise, causing regenerated contact material having conversion temperature to gravitate toward and eventually reach the upper surface of said bed, controlling the regenerated contact material so that it forms a freely falling shower of contact material which passes first through a charging zone, then through a flow deflection zone and thereafter arrives at the upper surface of said bed, spraying liquid hydrocarbon material towards the contact material to contact it in said charging zone and thereafter deflecting the charged contact material for movement along an inclined path during passage thereof through said flow deflection zone.

28. In a process for conversion of high boiling liquid hydrocarbons in the presence of a moving bed of particle form contact material the improvement comprising, maintaining a substantially compact bed of particle form contact material in a lower portion of a confined conversion zone and maintaining a bed-free space in an upper portion of said zone above the surface of said bed, causing contact material having conversion temperature to gravitate toward the upper surface of said bed, controlling the contact material in response to movement thereof through a metering passage so that it forms a freely falling shower of contact material having density which is a maximum at said metering passage where the particles of contact material engage each other and which progressively decreases as the particles of contact material move from each other during continued freely falling movement thereof, directing a spray of liquid hydrocarbon material into said shower at at least one level immediately below the level where the contact material falls from said metering passage so as to contact the pieces of contact material before they reach the surface of the bed, flowing hydrocarbon material downwardly within said bed and withdrawing lower boiling gasiform hydrocarbon products from said bed below its surface separately of the contact material, and withdrawing contact material from the lower section of said bed.

29. In a process for converting hydrocarbons involving the utilization of a bed of contact material which gravitates through a conversion zone the steps which comprise, maintaining a space free of said bed in an upper portion of said zone above the surface of said bed, delivering contact material in a downwardly flowing substantially compact stream of gravitating particles to a location in the upper section of said space and flowing the contact material from said stream through a restricted flow-regulating passage from which it drops through said space as a non-throttled shower of particles, exposing the contact material immediately above and below said restricted passage to the gaseous pressure in said space and spraying liquid hydrocarbon charge into said shower below said restricted passage to contact the particles of contact material before they reach the surface of said bed.

30. In a process for conversion of high boiling liquid hydrocarbons in the presence of a moving bed of particle form contact material the improvement comprising, maintaining a substantially compact bed of particle form contact material in a lower portion of a confined conversion zone and maintaining a bed-free space in an upper portion of said zone above the surface of said bed, introducing particle form contact material at a conversion supporting temperature into the upper section of said space as a substantially compact stream of gravitating particles, metering and radially deflecting said stream so that it forms a freely falling shower of particles gravitating through said bed-free space towards the surface of said bed, directing a spray of liquid hydrocarbon material into said shower so as to contact the pieces of contact material before they reach the surface of the bed, flowing hydrocarbon material downwardly within said bed and withdrawing lower boiling gasiform hydrocarbon products from said bed below its surface separately of the contact material, and withdrawing contact material from the lower section of said bed.

31. In a process for conversion of high boiling liquid hydrocarbons in the presence of a moving bed of particle form contact material the improvement comprising, maintaining a substantially compact bed of particle form contact material in a lower portion of a confined conversion zone and maintaining a bed-free space in an upper portion of said zone above the surface of said bed, introducing a stream of contact material at a conversion supporting temperature into the upper portion of said space, metering and causing said stream to flow downwardly over an upright conical surface to form a shower of freely falling contact material gravitating towards the surface of said bed, spraying liquid hydrocarbon charge onto the contact material as it falls freely just below said conical surface, flowing hydrocarbon material downwardly within said bed and withdrawing lower boiling gasiform hydrocarbon products from said bed below its surface separately of the contact material, and withdrawing contact material from the lower section of said bed.

THOMAS P. SIMPSON.

REFERENCES CITED

The following references are of record in the file of this patent:

UNITED STATES PATENTS

| Number | Name | Date |
|---|---|---|
| 1,158,624 | Brantingham | Nov. 2, 1915 |
| 1,825,374 | Thiele | Sept. 29, 1931 |
| 1,836,325 | James | Dec. 15, 1931 |
| 2,240,347 | Page et al. | Apr. 29, 1941 |
| 2,312,006 | Thiele | Feb. 23, 1943 |
| 2,348,156 | Sheppard | May 2, 1944 |
| 2,389,493 | Evans | Nov. 20, 1945 |
| 2,390,031 | Schutte et al. | Nov. 27, 1945 |

FOREIGN PATENTS

| Number | Country | Date |
|---|---|---|
| 255,159 | Great Britain | July 19, 1926 |